United States Patent

[11] 3,586,899

| | | |
|---|---|---|
| [72] | Inventor | Harold Fleisher |
| | | Poughkeepsie, N.Y. |
| [21] | Appl. No. | 736,428 |
| [22] | Filed | June 12, 1968 |
| [45] | Patented | June 22, 1971 |
| [73] | Assignee | International Business Machines Corporation |
| | | Armonk, N.Y. |

[54] APPARATUS USING SMITH-PURCELL EFFECT FOR FREQUENCY MODULATION AND BEAM DEFLECTION
7 Claims, 5 Drawing Figs.

[52] U.S. Cl................................................. 315/4, 331/94.5, 350/160
[51] Int. Cl................................................. G02f 1/31, H01j 25/00, H01s 3/00
[50] Field of Search.......................................... 315/1, 4, 5.25, 5.24; 350/162, 161; 331/94.5, 257; 313/73; 332/25

[56] References Cited
UNITED STATES PATENTS

| | | | | |
|---|---|---|---|---|
| 2,634,372 | 4/1953 | Salisbury...................... | | 315/1 |
| 3,439,167 | 4/1969 | Fox et al....................... | | 315/4 X |
| 2,688,107 | 8/1954 | Salisbury...................... | | 315/4 |
| 3,340,416 | 9/1967 | Young.......................... | | 315/4 |

Primary Examiner—Roy Lake
Assistant Examiner—V. Lafranchi
Attorney—Sughrue, Rothwell, Mion, Zinn and Macpeak ABSTRACT: An electron beam is deflected across the surface of a metallic grating to generate Smith-Purcell radiation. An amplifier which receives generated radiation from the grating from a predetermined direction will produce a frequency-modulated light or microwave beam. An amplifier which receives a signal of predetermined frequency and amplifies the signal at the angular position from which received serves as a beam deflector.

PATENTED JUN22 1971 3,586,899

INVENTOR.
HAROLD FLEISHER
BY
Sughrue, Rothwell, Mion, Zinn & Macpeak
ATTORNEYS

APPARATUS USING SMITH-PURCELL EFFECT FOR FREQUENCY MODULATION AND BEAM DEFLECTION

BACKGROUND OF THE INVENTION

This invention relates to wave generators, and more particularly to generators using the Smith-Purcell effect to vary the frequency and angular position of a light ray produced in the wave generators.

When a metallic diffraction grating is excited by passing an electron beam close to the surface of the grating, a periodic motion of the electron charge on the rulings of the grating is induced. This periodic motion causes radiation, which may be in the visible range, to appear from the surface of the grating. This physical phenomenon was reported by Smith and Purcell in *Review*, Volume 92, Number 4, at page 1069, and is consequently known as the Smith-Purcell effect. The wavelength of the emitted radiation is a function of the direction from which it is viewed, the spacing of the gratings, and the velocity of the electron beam.

In U.S. Pat. No. 2,634,372, the Smith-Purcell effect is used in an electromagnetic wave generator, together with a reflector and a magnet to move the reflector. Movement of the reflector allows modulation of the electromagnetic wave.

SUMMARY OF THE INVENTION

This invention produces a modulated electromagnetic wave, including but not limited to light waves, with a device having no moving parts. The invention is capable of a much higher percentage of electrooptical modulation than has been possible with prior art devices, thus allowing more efficient use of the information carrying capabilities of the light bandwidth.

In other embodiments, the invention produces a deflected light or microwave beam in which the deflection can be controlled electrically. This is done by a device having no moving parts.

DESCRIPTION OF THE PREFERRED EMBODIMENTS

Figure 1:
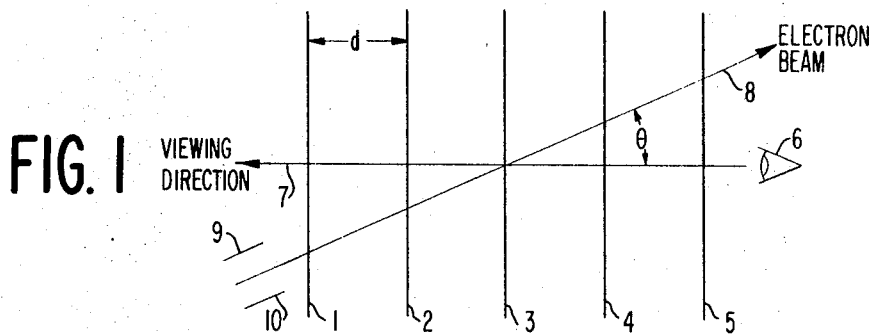
FIG. 1 is a plan view of a metallic deflection plate having an electron beam directed across its surface, and is shown to illustrate the Smith-Purcell effect.

FIG. 1 shows a section of a metallic diffraction grating, showing rulings 1 5. Five rulings are shown for illustration, but in practice many more would be used in a Smith-Purcell device. An observer 6 looks at the grating in viewing direction 7. An electron beam 8 passes across the surface of the grating at a back angle $\Theta$ to the viewing direction, generating light or other electromagnetic radiation on the surface of the grating. It can be shown that the wavelength of the generated radiation observed in the viewing direction is $\lambda$, given by $$\lambda = \frac{cd}{v \cos \Theta} - d \quad \text{(Equation 1)}$$

where $d$ is the grating separation, $c$ is the velocity of light and $v$ is the velocity of the electron beam.

If $\Theta$ is variable in Equation 1, then by differentiation $$\frac{d\lambda}{d\Theta} = \frac{cd \sin \Theta}{v \cos^2 \Theta} \quad \text{(Equation 2)}$$

Combining Equations 1 and 2 gives the following equation which relates the fractional change in wavelength to the fractional change in $\Theta$.

$$\frac{\Delta \lambda}{\lambda} = \frac{\Theta \tan \Theta}{1 - \beta \cos \Theta} \cdot \frac{\Delta \Theta}{\Theta} \quad \text{(Equation 3)}$$

where $$\beta = \frac{v}{c} \quad \text{(Equation 4)}$$

Thus, by changing the control voltages on deflection plates 9 and 10, thereby changing the angle $\Theta$, the wavelength and frequency of the radiation from the grating in the viewing direction can be changed.

Figure 2:
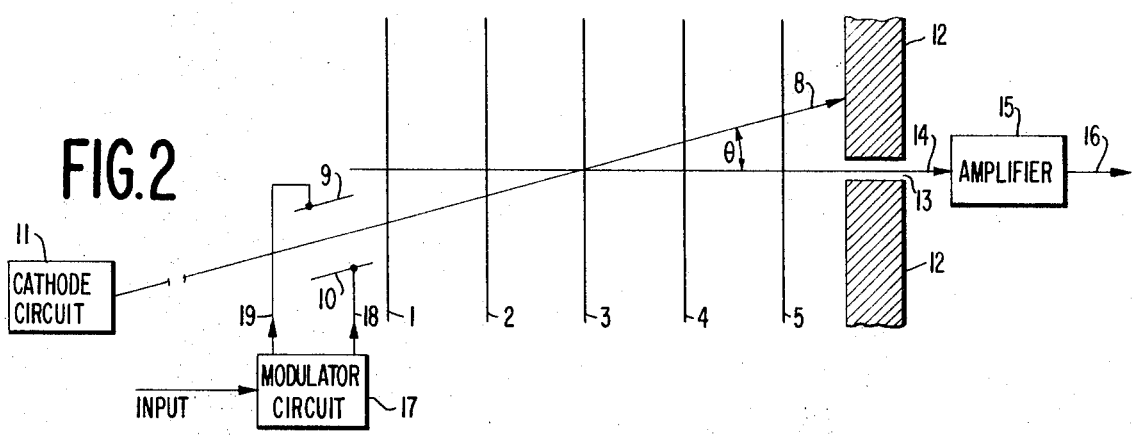
FIG. 2 is a plan view of an electrooptical modulator using the Smith-Purcell apparatus of FIG. 1.

FIG. 2 shows an electrooptical modulator using the Smith-Purcell apparatus of FIG. 1. Cathode circuit 11, including conventional focusing apparatus, produces electron beam 8, which crosses the surface of the metallic grating having rulings 1 through 5 and strikes anode 12. Modulating circuit 17 furnishes deflection voltages to deflection plates 9 and 10. Light or other electromagnetic radiation is produced on the surface of the grating. Hereafter in the description this radiation will be referred to as light, but it is understood that other forms of radiation, such as microwaves, are possible and can be utilized with appropriate substitution of masers for lasers, etc.

The grating surface light has a wavelength $\lambda$ dependent upon the back angle $\Theta$ between the viewing direction and the electron beam direction. $\lambda$ is given by Equation 1. Slit 13 between two sections of anode 12 controls the width of the light beam 14 allowed to reach optical amplifier 15. Other configurations of beam width control slit and anode will occur to those skilled in the art which will be within the scope of this invention. If slit 13 is made wider, the width of light beam 14 will be increased, allowing a greater wavelength spread in the light reaching amplifier 15. The allowable beam width is determined by the wavelength spread acceptable under no modulation conditions, which will depend upon the use to be made of the modulation device. When modulation circuit 17 applies deflection voltages to plates 9 and 10, the angle $\Theta$ is changed, changing the wavelength $\lambda$ of the light passing through slit 13.

Thus a voltage signal from circuit 17 can be used to modulate the frequency of light beam 14. Optical amplifier 15 receives the frequency modulated light beam 14 and produces a corresponding amplified light beam 16. Optical amplifier 15 can be a laser tuned to the center frequency emitted by the modulator, or it can be a nonlinear optical medium serving as an optical mixer.

If the amplifier 15 is a laser, it may be a laser without the conventional mirrors normally used for positive feedback. Although the amplifier can use a laser with our without mirrors, the absence of mirrors reduces switching time and allows faster modulation. The laser used has a finite bandwidth and can be of the type used for quantum measurements in astronomy.

If amplifier 15 is an optical mixer, two input beams are used—one beam being of high power at a carrier frequency, and the other beam being the low power signal bearing beam 14.

In the embodiment of this device for producing lower frequency signals, for example microwaves, amplifier 15 can be a wide band parametric amplifier.

Figure 3:
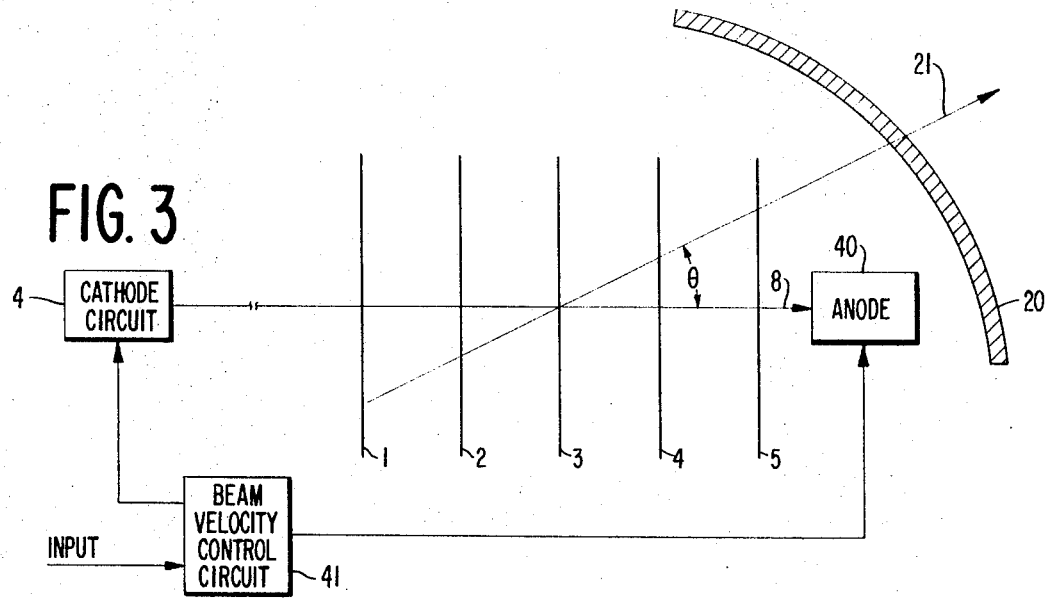
FIG. 3 is a plan view of a beam deflector using the Smith-Purcell apparatus of FIG. 1 with velocity control of the electron beam.

FIG. 3 illustrates a Smith-Purcell beam deflector. Cathode circuit 4 sends a focused electron beam 8 across the surface of grating elements 1 through 5 to strike anode 40. A monochromatic or narrow-band filter 20 for predetermined wavelength $\lambda_m$ is placed in an arc about the grating. Filter 20 may be a tuned laser or maser and have an additional function of amplification. The velocity of the electron beam is controlled by circuit 41, which controls the electron acceleration voltage between cathode 11 and anode 40. At some angle $\Theta$, which is to be controlled by this apparatus, a light beam 21 having a wavelength $\lambda_m$ will emerge and pass through filter 20.

From Equation 1 can be derived $v\cos\Theta = cd/d - \lambda_m$ (Equation 5) where $\lambda_m$ is a filter constant. Thus $v\cos\Theta$ is a constant for a predetermined wavelength output beam. If $v$ is varied, the angle $\Theta$ at which an output beam of wavelength $\lambda_m$ will appear is varied. If $v$ is constant, $\Theta$ is constant. By varying the input to circuit 41, which may include amplifiers and function generators, the velocity of the electron beam 8 can be varied, thus simultaneously varying the angle $\Theta$ at which the output beam appears.

If circuit 41 includes function generators, the output beam angle $\Theta$ can be made nearly any desired function of the system input signal. The function generators for the desired functions can be made by techniques well known to one skilled in the art.

Figure 4:
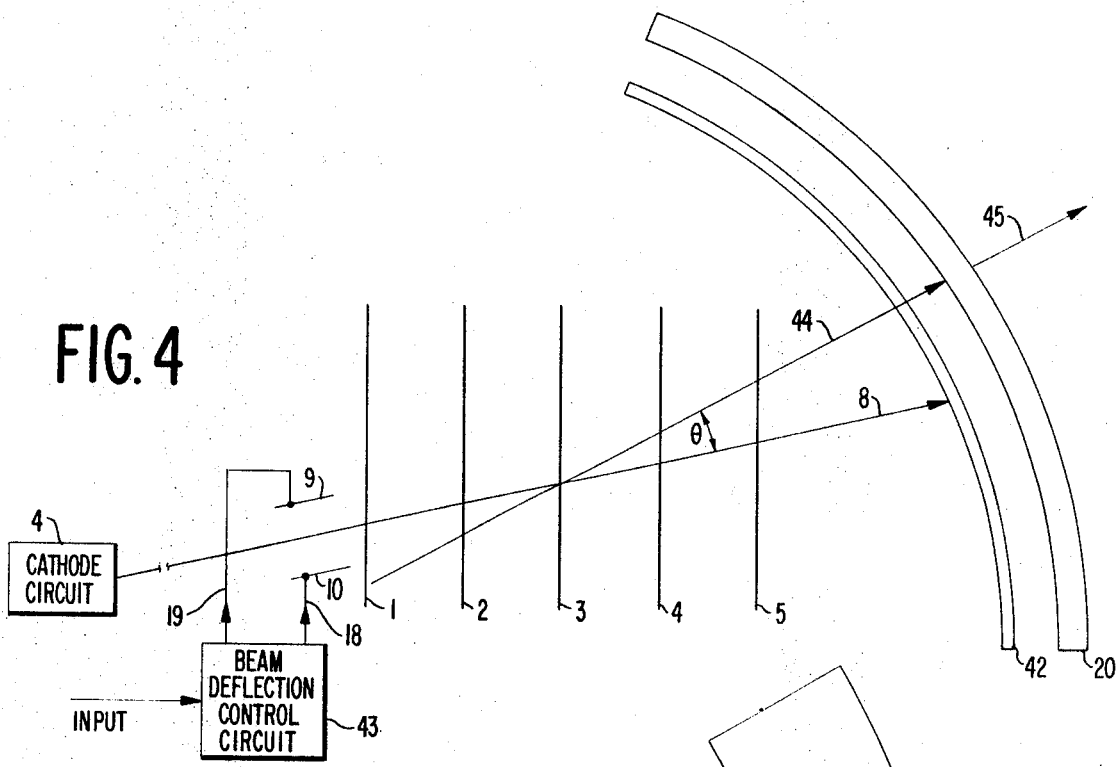
FIG. 4 is a plan view of a beam deflector using the Smith-Purcell apparatus of FIG. 1 with deflection control of the electron beam.

FIG. 4 illustrates another embodiment of the Smith-Purcell beam deflector. As is the case in FIG. 3, cathode circuit 4 sends a focused electron beam 8 across the surface of grating elements 1 through 5. In this embodiment the electron beam strikes transparent anode 42, which forms an arc about the grating. This transparent anode may be constructed of glass with a tin oxide coating. The angle $\Theta$ at which the beam 44 of electromagnetic radiation of wavelength $\lambda_m$ appears is controlled by the deflection voltage on deflection plates 9 and 10. The deflection voltage is generated by beam deflection control circuit 43 in response to an input signal. Circuit 43 may contain amplifiers and function generators to make angle $\Theta$ nearly any desired function of the input signal to circuit 43. Filter 20, which may include laser or maser amplification means, is tuned to pass only radiation of approximately wavelength $\lambda_m$. Thus the angular position at which output radiation beam 45 appears is controlled by the input signal to circuit 43.

The transparent electrode can be arranged in a layer which is a quarter-wavelength multiple to maximize transmission of light of the desired wavelength and to have a filtering effect on light of other wavelengths.

Figure 5:
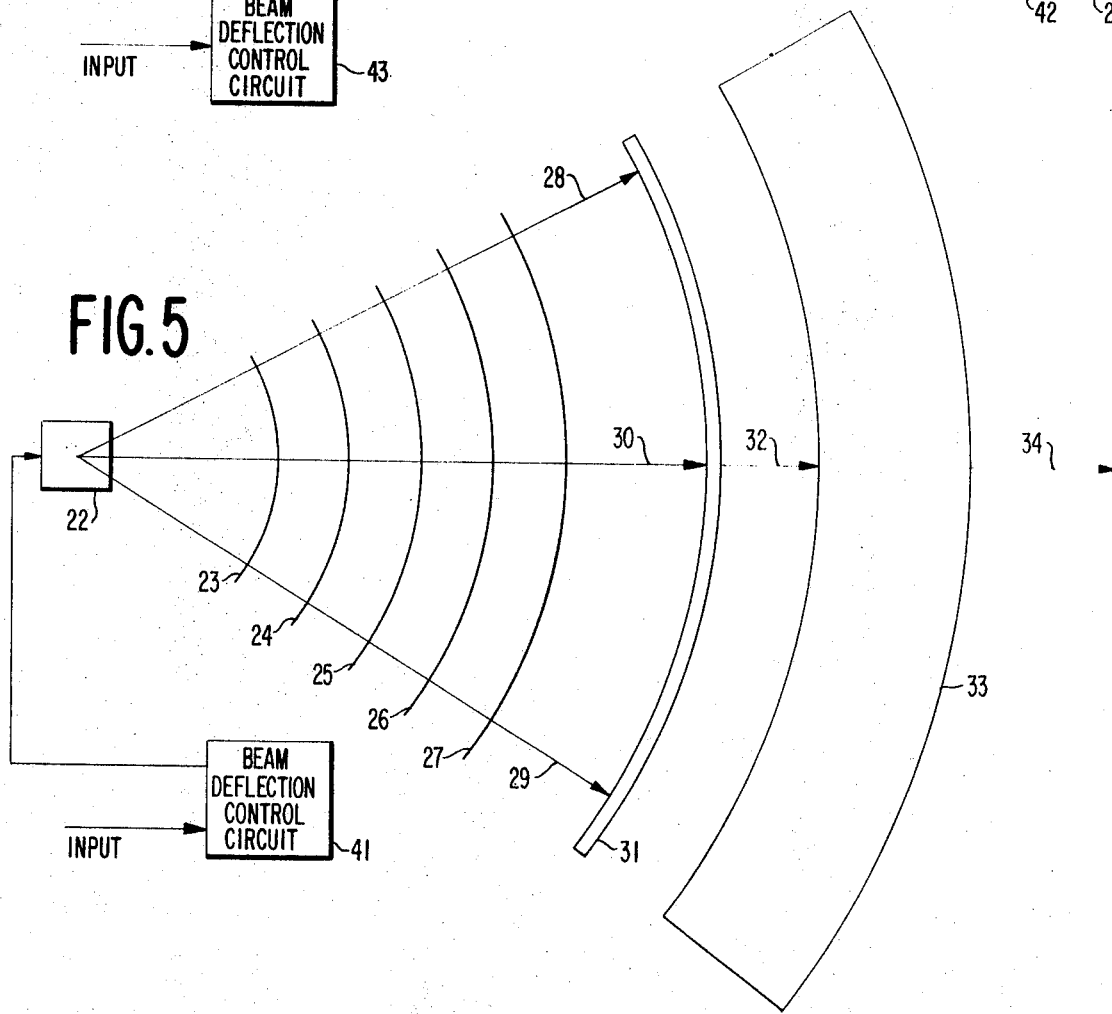
FIG. 5 is a plan view of a beam deflector using a modified Smith-Purcell apparatus having a concentric grating and a concentric amplifier.

FIG. 5 illustrates another embodiment of the Smith-Purcell beam deflector.

From Equation 1, if $v$ is constant, the shortest wavelength $\lambda$ is produced for $\Theta$ equal zero, that is for the light beam coincident with the electron beam.

In FIG. 5, element 22 is an electron gun designed to emit electrons at a constant velocity in a direction controlled by beam deflection control circuit 41, as that circuit is controlled by its input signal. The electron beam is directed across the surface of a grating containing a large number of parallel, concentric, equally spaced rulings 23 through 27. The electron beam traverses the rulings in a direction normal to the arcs and at an angle determined by circuit 41. Illustrative of some of the possible beam angles are beams 28, 29 and 30. However, only one of these beam angles is used at one time. In the further explanation of this circuit, it is assumed that beam 30 marks the angular position in use. Beam 30 continues its traverse of the rulings until it strikes transparent anode 31. Radiation beam 32, which is the shortest wavelength generated, was coincident with electron beam 30 until beam 30 stopped at the anode. Radiation beam 32 continues through transparent anode 31 and strikes the input of tuned concentric radiation amplifier 33. Concentric amplifier 33 is tuned to the shortest wavelength emitted and amplifies only that wavelength. Output radiation signal 34 is produced at the same angular deflection as was the electron beam.

When the shortest output wavelength of the radiation reaching concentric amplifier 33 is in the light wavelength, amplifier 33 can be a laser amplifier which may be selected from the following examples: a travelling wave laser amplifier involving a nonresonant cavity, a pulsed power laser amplifier, a saturation-level laser amplifier, a Stokes and Raman amplifier, a semiconductor laser amplifier, or other amplifiers which may occur to a skilled artisan.

The radiation pattern of the amplified radiation as it emerges from the laser amplifier will be collimated unless an appropriate scatterer is placed on the exit surface of the laser amplifier. Such a scatterer may produce a light distribution suitable for display purposes.

Many more examples of the application of the present invention will suggest themselves to those skilled in the art. Alternative methods of accomplishing the invention may suggest themselves to those skilled in the art. Accordingly, the scope of the present application is only limited to the extent of the claims which follow.

I claim:

1. A device for generating and deflecting a high-frequency electromagnetic beam comprising:
   a. a grating having a large number of coplanar conductive rulings, each situated at equal intervals along a line normal to said rulings,
   b. means for directing an electron beam across the surface of said grating to generate electromagnetic radiation including a high-frequency electromagnetic beam of a given wavelength,
   c. means for varying the motion of said electron beam to vary the direction of said electromagnetic beam of said given wavelength, and
   d. filter means for passing only said electromagnetic beam of said given wavelength and shaped to intercept the directionally varying electromagnetic beam of said given wavelength, whereby the electromagnetic beam passed by said filter means is deflected in accordance with the varying motion of said electron beam.

2. A device as defined in claim 1 wherein said high-frequency electromagnetic beam is in the light spectrum.

3. A device as defined in claim 1 wherein said conductive rulings are arranged in straight lines.

4. A device as defined in claim 1 wherein the velocity of said electron beam is maintained constant, and wherein said means for varying the motion of said electron beam comprises means for varying the angle between said electron beam and said line normal to said rulings to thereby vary the direction of said electromagnetic beam of said given wavelength, whereby the electromagnetic beam passed by said filter means is deflected in accordance with the angle between said electron beam and said line normal to said rulings.

5. A device as defined in claim 4 wherein said conductive rulings are arranged in arcs of concentric circles having a common center coincident with the axis of the angular variation of said electron beam so that rulings and the electron beam are perpendicular at all angles of the electron beam.

6. A device as defined in claim 1 wherein said means for varying the motion of said electron beam comprises electron accelerating means for varying the velocity of said electron beam to thereby vary the direction of said electromagnetic beam of said given wavelength, whereby the electromagnetic beam passed by said filter means is deflected in accordance with the velocity of said electron beam.

7. A device for generating and frequency modulating a high-frequency electromagnetic beam comprising:
   a. a grating having a large number of coplanar conductive rulings, each situated at equal intervals along a line normal to said rulings,
   b. means for directing an electron beam across the surface of said grating to generate electromagnetic radiation including said electromagnetic beam,
   c. a fixed aperture in the path of said radiation for passing said high-frequency electromagnetic output beam, and
   d. means for deflecting said electron beam to vary the angle thereof relative to said normal line in the plane of said surface of said grating, thereby producing at the output of said aperture a high-frequency electromagnetic output beam whose frequency is modulated in accordance with said angle of said beam.